June 15, 1954  M. E. SILVA  2,680,928
ADJUSTABLE-TENSION SINKER RELEASE FOR FISHLINES
Filed March 23, 1951
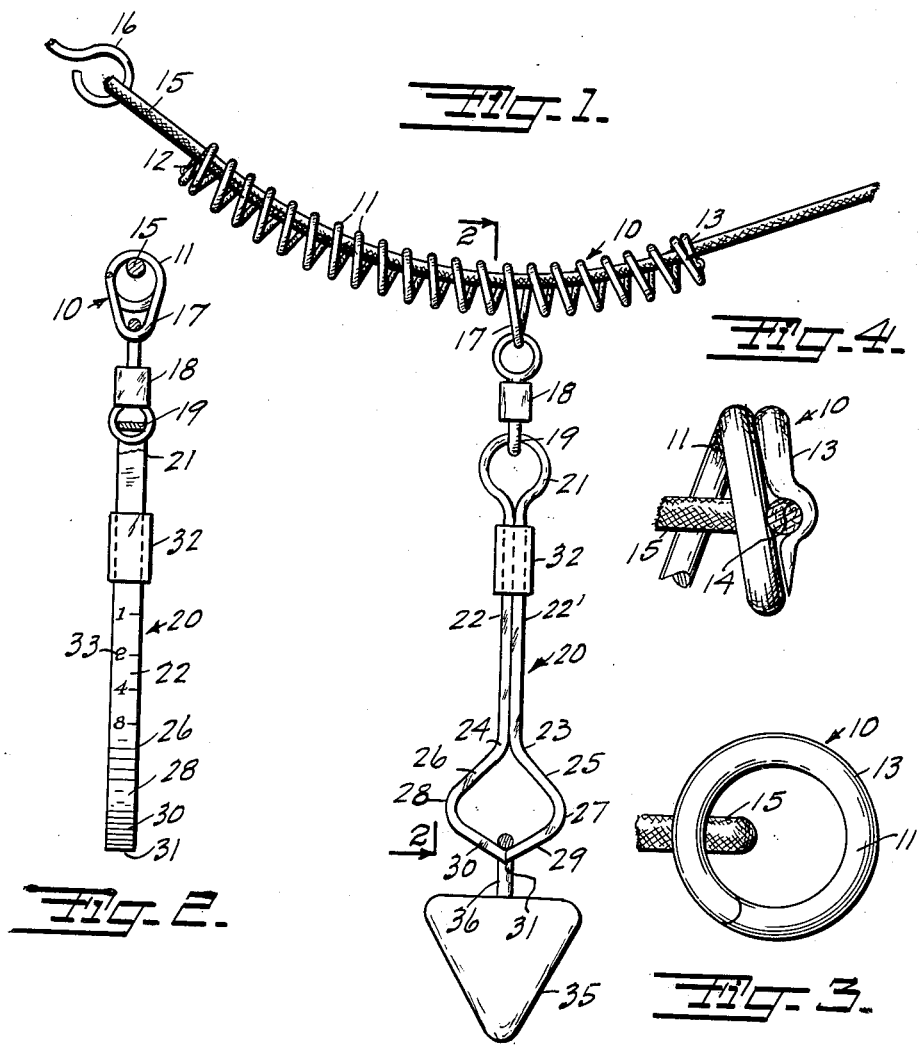
Inventor
Mathew E. Silva
By Philip A. Friedell
Attorney Patented June 15, 1954

2,680,928

UNITED STATES PATENT OFFICE 2,680,928

ADJUSTABLE-TENSION SINKER RELEASE FOR FISHLINES

Mathew E. Silva, Hayward, Calif.

Application March 23, 1951, Serial No. 217,220

1 Claim. (Cl. 43—43.12)

This invention relates to improvements in sinker mounting and releasing means for fish lines, and provides a sinker mounting which is adjustable for release of the sinker under any desired reaction, according to the type and size of fish angled for, and the weight of sinker to be used.

The objects of the invention are to provide sinker holding means which is adjustable as to tension to support sinkers of different weights and to instantly release the sinker when a fish strikes the hook with predetermined force dependent upon the weight of the sinker and the adjustment of the holding means, so as to release the weight from the line and thus preserve the fighting ability of the fish, and to provide a sinker holding means which is relatively simple in construction and economical to manufacture.

In describing the invention reference will be had to the accompanying drawing, in which:

Fig. 1 is a side elevation of the invention.

Fig. 2 is a section taken on line 2—2 of Fig. 1, a portion of the spring in rear being removed and the sinker being detached.

Fig. 3 is an enlarged fragmentary view showing one end of the sliding mounting with the fishline in gripped position.

Fig. 4 is an end view of Fig. 3.

The invention includes a sliding mounting 10 in the form of an open or compression type spring 11 terminating in closed end convolutions 12 and 13, the closing portion of each end convolution having a recess 14 formed on the underside with a depth equal to about two-thirds the diameter of the lightest fishline to be used, so that, if the slide is to be fixed in position on the line 15, it can be drawn between the convolutions toward the end of the terminal of the closing portion until it engages in the recess, where it will be clamped, securely holding the line at both ends of the spring. Under such conditions it can be used as a casting line. If the line is drawn from between the end convolutions the mounting will be free, and permit the line to slide through it, as when fishing in a current, when the device will sink to the bottom of the stream or body of water, and the hook will flow with the current with the line paying out through the mounting. It will be noted that the line can be threaded into the mounting at any point on the line at will without removing any of the other elements such as the hook 16, and can likewise be removed at will.

One convolution of the spring 11, as indicated at 17, is elongated to extend beyond the other convolutions, and a swivel 18 is threaded onto the spring to this elongated convolution for retention in that location, and the adjustable sinker holder 20 is attached to this swivel as indicated at 19.

The sinker holder 20 consists of a strip of spring metal having an eye 21 formed centrally of its length, the two extensions or legs 22 and 22′ being brought together in resilient contact as shown, with the terminal portions first being formed outwardly at 23 and 24 in opposition to form the angular divergent portions 25 and 26 and continuing through reverse bends at 27 and 28 and terminating in convergent gripping fingers 29 and 30 formed at an included angle of greater than 90. These fingers engage each other at their terminal ends 31 under tension to form a spring tong. A slide 32 is frictionally slidable on the legs 21 and 22, and one of the legs is provided with graduations 33 for registry with one end of the slide 32 for suitable setting for different weights of sinkers; the farther down toward the gripping fingers the slide is adjusted, the greater the pull on the hook 34 will be required to release the sinker 35.

As will be noted, when a fish strikes the hook, the jerk on the line will cause the gripping fingers 29 and 30 to spread and pass over the ring 36 releasing the sinker, so that the fish will not have to fight the weight and consequently will not be quickly tired out as is the case when the fish is loaded down by the weight of the sinker.

I claim:

A sinker release comprising a length of spring metal having an eye formed centrally of its length and with the extensions from said eye consisting of leg portions terminating in gripping portions, with the leg portions formed parallel and in absolute resilient contact under predetermined initial tension throughout their lengths, and with the gripping portions being formed into tong members with the terminal ends in absolute resilient contact under predetermined initial tension to grip about the eye of a sinker and support a sinker of predetermined weight and to release the sinker under predetermined urgence, and a member encompassing said leg portions normally adjacent to said eye for said initial tension, and slidable along said leg portions to said gripping portions to decrease the free lengths of the leg portions to increase the tension between said tong members for gripping about the eye of and supporting a sinker or greater weight and for releasing the sinker or greater weight under increased urgence.

References Cited in the file of this patent

UNITED STATES PATENTS

| Number | Name | Date |
|---|---|---|
| 281,967 | Bush | July 24, 1883 |
| 615,078 | Lubbock | Nov. 29, 1898 |
| 738,923 | Lewis | Sept. 15, 1903 |
| 893,541 | Plemon | July 14, 1908 |
| 1,033,464 | Pomeroy | July 23, 1912 |
| 1,371,348 | Brown | Mar. 15, 1921 |
| 1,515,622 | Sarlabous et al. | Nov. 18, 1924 |
| 1,575,590 | Limpright | Mar. 2, 1926 |
| 2,042,891 | Gailey | June 2, 1936 |
| 2,222,277 | Baker | Nov. 19, 1940 |
| 2,227,420 | Augenblick | Jan. 7, 1941 |
| 2,474,167 | Rundell | June 21, 1949 |
| 2,507,762 | Drabik | May 16, 1950 |